United States Patent Office 3,164,616
Patented Jan. 5, 1965

3,164,616
PROCESS FOR PREPARING Δ¹¹-STEROID COMPOUNDS
Kekhusroo R. Bharucha, Toronto, Ontario, Canada, assignor to Canada Packers Limited, Toronto, Ontario, Canada
No Drawing. Filed Sept. 17, 1963, Ser. No. 309,404
21 Claims. (Cl. 260—397.1)

This invention relates to the preparation of Δ¹¹-steroid compounds from corresponding 12-hydroxy steroids and, in particular, to a process for the conversion of desoxycholic acid and derivatives thereof into Δ¹¹- steroid compounds.

The process of the invention is useful in the synthesis of cortison and hydrocortisone and other corticoidal hormones and analogues thereof which are characterized by the presence of an oxygen function at C-11. Steroid compounds having Δ¹¹-unsaturation, as is well known in the art, are important intermediates for preparation of 11-oxygenated steroids. There are a number of well-known processes for the preparation of Δ¹¹ compounds from corresponding 12-hydroxy compounds, but these processes in general result in low yields and, in many instances, involve a number of complex reaction steps. (Fieser and Fieser, "Steroids," 1959, page 636). No really satisfactory method for this conversion has been worked out.

It has now been found that 12-hydroxy steroids can be efficiently converted into Δ¹¹-compounds in good yield by sulfonation and dehydrosulfonation procedure, provided proper reaction conditions are employed. The conversion of a sterol into an aryl sulfonate and subsequent elimination of the elements of sulfonic acid therefrom is a well-known method for the introduction of double bonds in the steroid nucleus. This method has been suggested for the synthesis of a number of Δ¹¹-steroids. Thus, Euw and Reichstein (Euw and Riechstein, Helv. Chim. Acta, 1946, 29, 654) disclosed a route to 3-keto-Δ¹¹- etienic acids comprising tosylation of 12α-hydroxy sterols derived from desoxycholic acid and removal of the 12α- tosyloxy group. They found that best results for dehydrotosylation were obtained by using refluxing collidine or pyridine under pressure. Even under these stringent conditions the dehydrotosylation was very sluggish and some unchanged starting material was always recovered resulting in only fair yields (maximum—40% including recovery of unchanged tosylates). Better yields have been claimed by repeated passage of the 12α-tosylates through columns of activated, slightly alkaline alumina. (G. Just and Ch. R. Engel, J. Org. Chem. 23, 12 (1958).) This modification, however, has been found to be impractical on a large scale and, furthermore, lacks generality, functioning best only when the molecule possesses certain features, e.g., a 17α-methyl grouping which would exert enhancing action on the elimination of the tosyloxy grouping.

It would appear that the dehydrosulfonation of 12α- sulfonates to give Δ¹¹-compounds should be very facile since both the 11β-hydrogen atom and the 12α-sulfonate grouping are diaxial and, hence coplanar. This view, however, does not take into consideration the hindered nature of the 11β-substituent and it appears that the difficulties in the past have stemmed from the inaccessibility of the 11β-hydrogen atom to attack by the base as a result of steric overcrowding by the C-10 and C-13 angular methyl groups.

It is an object of the invention, therefore, to provide an improved process for the preparation of Δ¹¹-steroid compounds from corresponding 12-hydroxy steroid compounds.

Another object of the invention is to provide an improved method for dehydrosulfonation of steroid compounds having a 12-organo-sulfonate group.

A more specific object is to provide an improved process for the preparation of 3α-acetoxy-Δ¹¹-methyl cholenate from the 3-mono-acetate of methyl desoxycholate.

In accordance with the present invention it has been found that dehydrosulfonation takes place quite readily and with greatly improved yields when the 12-sulfonate is treated with a strong metallic alkoxide base, such as a metal tertiary alcoholate, e.g., alkali metal tertiary butoxide, in the presence of a dipolar aprotic solvent medium. Particularly good results are obtained when the dehydrosulfonation is conducted by treatment of the 12-sulfonate with potassium tertiary butoxide in dimethylsulfoxide. Thus, treatment of a steroidal compound having a 12α-sulfonate group with potassium tertiary butoxide in anhydrous dimethylsulfoxide on a steam-bath for about an hour results in substantially complete dehydrosulfonation. Lower temperatures and longer reaction times may be used with satisfactory results. Substantially complete dehydrosulfonation will take place at room temperature if the reaction mixture is allowed to stand for several days or longer. In general, temperatures of about 40° to 120° C. are preferred.

The process of the invention has general application to 12-hydroxy steroids and may be applied, for example, to derivatives of ergostane, cholestane, coprostane, sitostane, stigmastane, spirostane, cholane, allocholane, pregnane, allopregnane, and androstane. The starting materials can be variously substituted in the nucleus or in the side chain. The starting materials can have any configuration and may also contain double bonds at other positions in the molecule. The invention, however, is especially useful with compounds of the bile acid series such as desoxycholic acid and derivatives thereof, e.g., derivatives wherein the 17-side chain is

—CH(CH₃).CH₂CH₂COOH, —CH(CH₃).COOH, —COOH

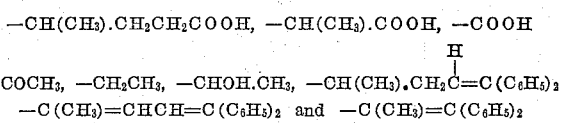

—COCH₃, —CH₂CH₃, —CHOH.CH₃, —CH(CH₃).CH₂C=C(C₆H₅)₂
—C(CH₃)=CHCH=C(C₆H₅)₂ and —C(CH₃)=C(C₆H₅)₂

Where the side chain includes carboxylic acid groups or hydroxyl groups, they should be esterified or acylated before carrying out the sulfonation step.

The sulfonating agent can be an aliphatic or aromatic sulfonic acid or corresponding acid halide, such as the chloride. Organic sulfonyl chlorides such as alkyl sulfonyl chlorides wherein the alkyl radical contains from 1 to 12 carbon atoms or aryl sulfonyl chlorides wherein the aryl group is either unsubstituted or substituted can be satisfactorily used. Representative examples of suitable organic sulfonating agents are para-toluenesulfonyl chloride, benzenesulfonyl chloride and methylsulfonyl chloride. Inorganic sulfonating agents, e.g., chlorosulfonic acid, likewise, may be useful.

Hydroxyl groups in other parts of the steroid molecule may be protected as by conversion into acyloxy groups, for example, acetoxy, propionoxy or benzoyloxy groups, and as aforementioned, acid groups are conveinently converted into the corresponding esters. Thus, where the starting material is desoxycholic acid, it is first converted into the 3α-acyloxy cholanate.

The conditions under which the sulfonation of the 12-hydroxy group may be carried out are, in general, known to the art. It is prefered to use pyridine as the solvent medium for such reaction. Sulfonation with sulfonyl chlorides in pyridine at temperatures of 30° to 60° C. provides good results, but it should be realized that the temperature is not sharply critical. The amount of sulfonating agent is not particularly critical and, in general, any excess over the theoretical may be used.

It is not necessary that the steroidal sulfonate be isolated from the reaction mixture in pure form prior to the dehydrosulfonation reaction. The crude material may be satisfactorily used in the next step.

The strong metallic alkoxide base used for the dehydrosulfonation reaction, as pointed out above, is preferably potassium tertiary butoxide. Other metal tertiary alcoholates may be used, but generally provide no advantage. It is important that the solvent medium in which the dehydrosulfonation takes place be an aprotic dipolar solvent. Refluxing collidine and pyridine, as pointed out above, provide poor yields. By using the strong metallic alkoxide base in combination with a dipolar aprotic solvent under anhydrous conditions, such as dimethylsulfoxide, as high as 90% conversion of the 12-sulfonate to the $\Delta^{11}$-compound can be obtained and yields of 70% or better, based on the 12-hydroxy steroid starting material, may be obtained. In lieu of dimethylsulfoxide, other dipolar aprotic solvents of the same class, such as N-methylpyrrolidone, dimethylformamide and sulfolane under anhydrous conditions may be utilized.

The overall process of the invention is exemplified by the following diagram:

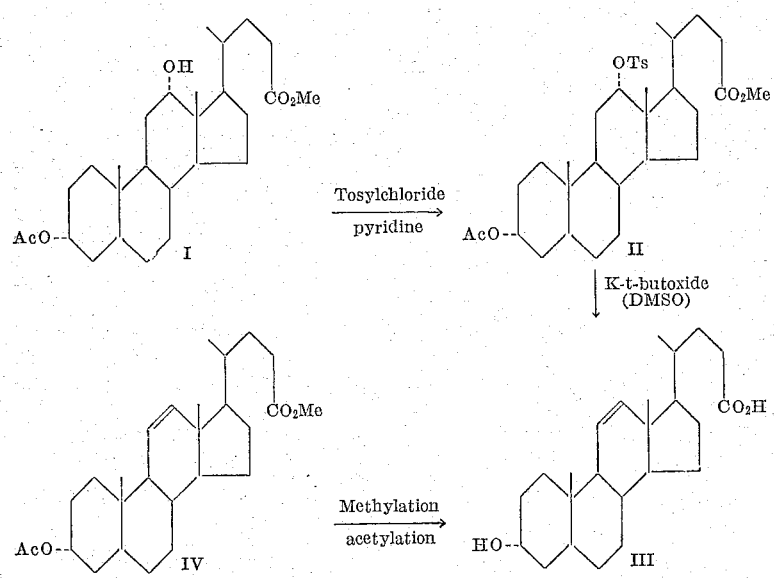

Tosylation of 3α-acetoxy-12α-hydroxy-methyl cholanate (I) proceeds to completion by carrying out the reaction at 55° C. for 96 hours or at lower temperature, e.g., (37° C.) for longer time (120 hrs.) to give the 12α-tosylate (II). The latter, obtained in ca. 93% weight yield, without purification is heated with a solution of K-tert.-butoxide in anhydrous dimethylsulfoxide (DMSO) on a steam-bath for 1 hour, whereupon the elements of p-toluenesulfonic acid are lost completely with the introduction of the $\Delta^{11}$-double bond; simultaneously the 3-acetate and side chain methyl ester groupings are also saponified. The crude product (III) from the butoxide treatment is then methylated and acetylated to give, after purification, the desired 3α-acetoxy-$\Delta^{11}$-methyl cholanate (IV) in an overall yield of about 70% based on (I).

Parallel results are obtained using benzenesulfonyl chloride and other sulfonating agents in place of p-toluenesulfonyl chloride. Other 12-hydroxyl starting materials may be used.

The following specific examples are illustrative of the invention.

EXAMPLE 1

*Preparation of 3α-Acetoxy-12α-Tosyloxy-Methyl Cholanate*

A solution of 3α-acetoxy-12α-hydroxy methyl cholanate (2.5 g.) and p-toluenesulfonyl chloride (2.5 g.) in anhydrous pyridine (5 cc.) was heated at 55° C. ±1° C. for 96 hours. Samples taken out after 72 and 96 hours heating showed very little, if any, OH group on Infrared (I.R.) analysis. During the heating an oil separated out. On cooling the reaction mixture to room temperature, a few drops of water were added (to destroy excess tosyl chloride) and then dil. (10%) HCl, when a sticky gum separated out. This was extracted twice with ethyl acetate, the organic extracts combined, washed with water, then dil. HCl and then three times with water to pH 5. Evaporation of the dried extracts in vacuo at 45–50° C. (bath temperature) provided 3α-acetoxy-12α-tosyloxy-methyl cholanate as a colorless gum/froth (3.12 g.; 92.8% of theoretical yield).

$E_{1cm}^{1\%}$ 225 m$\mu$=205 in ethanol

EXAMPLE 2

*Preparation of 3α-Acetoxy-12α-Benzenesulfonyloxy-Methyl Cholanate*

A solution of 3α-acetoxy-12α-hydroxy-methyl cholanate (2.5 g.) in anhydrous pyridine (5 cc.) and benzenesulfonylchloride (1.7 cc.) was heated at 55° C. ± 1° C. for 96 hrs. At the end of 24 hrs. heating a brownish oil was seen to have separated out. At the end of the reaction the mixture was cooled to room temperature, when the dark brown oil solidified. Water was gradually added, with cooling, to destroy excess sulfonyl chloride, the clear solution allowed to stand at room temperature for 15 minutes and then diluted with more water. The oil that separated out was extracted twice with ether after acidification with dil. HCl, the ethereal extracts combined, washed three times with water to pH 5–5.5, dried and evaporated in vacuo at 45–55° C. (bath temperature) to constant weight. 3.11 g. (94.8% of theoretical yield) of 3α-acetoxy-12α-benzenesulfonyloxy-methyl cholanate as a nearly colorless gum was recovered.

$E_{1cm}^{1\%}$ 217 m$\mu$=137 in ethanol

I.R. showed no OH band.

EXAMPLE 3

Treatment of 3α-acetoxy-12α-hydroxy-methyl cholanate (5 g.) with benzenesulfonyl chloride (3.4 cc.) in anhydrous pyridine (10 cc.) for 113 hrs. at 55° C.±1° C. and isolation of the product with benzene gave the crude benzenesulfonate as a pale yellow viscous gum (6.14 g.; 93.6%), $E_{1cm}^{1\%}$ 217 m$\mu$=135 in ethanol I.R. showed no OH band.

EXAMPLE 4

*Preparation of 3α-Acetoxy-Δ$^{11}$-Methyl Cholanate*

A solution of the crude 3α-acetoxy-12α-tosyloxy methyl cholanate (1.87 g.; from Example 1 above) in anhydrous dimethylsulfoxide DMSO (25 cc.) was treated with potassium-t-butoxide (1.87 g.) and the mixture thoroughly flushed with nitrogen for 10–15 minutes. It was then heated on the steam-bath for 1 hr. Crystals began to separate out within 15 minutes of heating. On cooling, water was added and the solution acidified with dil. (10%) HCl. After refrigeration for 4 hrs. the colorless solid was filtered off, washed with water to neutrality and dried at 31° C./10 mm. for 18 hrs. and then at 45–50° C./10 mm. for 4 hrs. The crude 3α-hydroxy-Δ$^{11}$-cholenic acid thus obtained weighed 1.222 g., M.P. 136–140° C. (124° C. sinters). It exhibited no absorption maximum in the 220–340 mμ region, indicating complete removal of the tosylate grouping.

A portion (1.212 g) of the Δ$^{11}$- compound was esterified with ethereal diazomethane in the presence of traces of methanol to give after evaporation of solvents in vacuo at 45–50° C. (bath temperature) crude 3α-hydroxy-Δ$^{11}$-methyl cholanate as a colorless solid (1.255 g.). The latter was acetylated in pyridine (2 cc.; anhydrous) and acetic anhydride (2 cc.) at room temperature for 40 hrs. A few drops of water were then added, with cooling, when crystallization set in. More water (ca. 75 cc.) was added and the mixture refrigerated for 7 hrs. Filtration, washing with dil. (10%) HCl, then water and drying at 30° C./10 mm. for 20 hrs. gave crude 3α-acetoxy-Δ$^{11}$-methyl cholanate as a pale yellow solid (1.35 g.), M.P. 95–111° C. (92° C. sinters).

For purification, the preceding solid (1.32 g.) was dissolved in a mixture (1:1) of hexane-benzene and put on a column of Florisil (32 g.). The residues (total weight 1.0 gram) obtained from evaporation of the hexane-benzene and benzene fractions upon crystallization from methanol gave pure 3α-acetoxy-Δ$^{11}$-methyl cholanate as a colorless solid (0.98 g.), M.P. 119–120°. This represents an overall yield of about 70% based on 12α-hydroxy starting compound (about 74% based on the crude tosylate).

EXAMPLE 5

A mixture of crude tosylate (0.4 g.; same starting material as used in Example 4) and K-t-butoxide (400 mg.) in anhydrous DMSO (8 cc.) was heated on the steam-bath in N$_2$ atmosphere for 1 hr. 15 minutes. Isolation as above gave crude 3α-hydroxy-Δ$^{11}$-cholenic acid (0.233 g.). U. V. showed no absorption maximum in the 220–340 mμ region. TLC (Thin layer chromatogram) showed 2 spots with the top one being ca. 80%. A portion (0.206 g.) of the preceding solid was treated with acetone at room temperature, filtered from insolubles, the filtrate concentrated to a small volume, diluted with water to turbidity and allowed to crystallize in the refrigerator overnight, to give pure 3α-hydroxy-Δ$^{11}$-cholenic acid as colorless needles, M.P. 162–163° C.

EXAMPLE 6

A mixture of crude 3α-acetoxy-12α-benzenesulfonyloxy-methyl cholanate (3.06 g.; from Example 2 above) and K-t-butoxide (3.06 g.) in anhydrous DMSO (25 cc.) was flushed with dry N$_2$ for 10–15 minutes before heating on the steam-bath for 1 hr. Within 20 minutes, copious crystallization occured. On cooling, water and dil. (10%) HCl were added and the solid filtered off, after refrigeration overnight, washed with water and dried to constant weight at 34° C./10 mm. Weight of colorless solid: 2.035 g.; M.P. 132–142° C. (120° sinters). No absorption maximum in the 217–340 mμ region.

A portion (2.013 g.) of the crude 3α-hydroxy-Δ$^{11}$-cholenic acid was esterified with ethereal diazomethane in the presence of a little methanol in the usual manner to give crude 3α-hydroxy-Δ$^{11}$-methyl cholanate as a yellow gum (2.17 g.). The latter was acetylated in anhydrous pyridine (3.5 cc.) and commercial acetic anhydride (3.5 cc.) at room temperature for 43 hrs. On cooling, water was added, when a gum separated out. It was extracted twice with ether, after acidification of the mixture with dil. (10%) HCl. The ethereal extracts were combined, washed with water, dried over anhydrous Na$_2$SO$_4$ and evaporated in vacuo at 45–55° C. (bath temperature) to leave crude 3α-acetoxy-Δ$^{11}$-methyl cholenate as a yellow semicrystalline mass (2.37 g.). For purification, the latter (2.35 g.) was dissolved in benzene (4 cc.)-hexane (8 cc.) and put on a column of Florisil (58 g.), prepared in hexane. The residues obtained from evaporation of the hexane-benzene and benzene fractions upon crystallization from methanol gave pure 3α-acetoxy-Δ$^{11}$-methyl cholenate as a colorless solid (1.588 g.), M.P. 115–118° C. This represents an overall yield of 72.3% based on the crude benzenesulfonate.

EXAMPLE 7

Crude 3α-acetoxy-12α-benzenesulfonyloxy-methyl cholanate (3.005 g.; from Example 3 above) and K-t-butoxide (2.4 g.) in anhydrous DMSO (20 cc.) was heated (N$_2$ atmosphere) on the steam-bath for 1 hr. Isolation of the product as before gave crude 3α-hydroxy-Δ$^{11}$-cholenic acid as a colorless solid (1.981 g.), M.P. 132–152° C. (129° C. sinters). No absorption maximum in the 215–340 mμ region. TLC showed 2 spots with the top one being 75–80%.

A portion (1.972 g.) was converted with ethereal diazomethane into the methyl ester, which was obtained as a yellow gum (2.05 g.). The latter was acetylated in pyridine (3.5 cc.; anhydrous) and acetic anhydride (3.5 cc.) at room temperature for 30 hrs. and the product isolated by extraction with ether to give crude 3α-acetoxy-Δ$^{11}$-methyl cholenate as a yellow gum (2.251 g.). I.R. showed no band in the OH stretching region indicating that the acetylation was complete despite the shorter than usual reaction time.

For purification, a portion (2.23 g.) was dissolved in benzene (1 cc.)-hexane (5 cc.) and put on a column of Florisil (55 g.), prepared in hexane. The residues (1.8 grams) obtained as in the previous examples on crystallization gave pure 3α-acetoxy-Δ$^{11}$-methyl cholenate as colorless solid (1.64 g.), M.P. 114–117° C. TLC showed a single spot. This represents an overall yield of 75.9% based on the crude benzenesulfonate.

EXAMPLE 8

Crude 3α-acetoxy-12α-benzenesulfonyloxy-methyl cholanate (0.20 g.) and K-t-butoxide (0.160 g.) in anhydrous DMSO (2 cc.) was stirred at room temperature for 65 hours. Isolation of the product by pouring into water and acidification with dilute HCl yielded crude 3α-hydroxy-Δ$^{11}$-cholenic acid (0.128 g.), M.P. 105–130° C. I.R. showed a band at 730 cm.$^{-1}$ (Δ$^{11}$ grouping). No absorption maximum in the 215–340 mμ region.

EXAMPLE 9

A mixture of crude 3α-acetoxy-12α-toxsyloxy-methyl cholanate (2.5 g.), obtained as in Example 1 in 98% yield, and K-t-butoxide (2.5 g.) in anhydrous N-methyl-pyrrolidone was stirred and heated at 100–105° C. (bath temperature) for one hour in N$_2$ atmosphere. Isolation of the product with benzene gave crude 3α-hydroxy-Δ$^{11}$-cholenic acid (2.05 g.) as a gum. Methylation and acetylation in the usual manner gave a gum (1.858 g.) which, upon chromatographic purification gave 0.972 g. (M.P. 110–118° C.). Crystallization from methanol gave pure 3α-acetoxy-Δ$^{11}$-methyl cholenate as a colorless solid (0.919 g.) M.P. 120–121° C. The overall yield based on the crude tosylate was approximately 53%.

EXAMPLE 10

A mixture of crude tosylate (2.5 g.) (same starting material as in the preceding example) and K-t-butoxide (2.5 g.) in anhydrous sulfolane (20 cc.) was stirred and heated at 100°–110° C. (bath temperature) for one hour in a nitrogen atmosphere. Isolation of the product by pouring into water and acidification with dilute HCl gave a solid (2.013 g.). Methylation and acetylation in the usual manner gave a gum (2.01 g.). A portion (1.98 g.) was chromatographed on Florisil (50 g.) as in the preceding examples and gave crude 3α-acetoxy-$\Delta^{11}$-methyl cholenate (0.942 g.). This material is purified by crystallization from methanol as before.

EXAMPLE 11

A solution of 3α-acetoxy-12α-hydroxy-methyl cholanate (2.5 g.) and mesyl chloride (0.83 cc.) in anhydrous pyridine (5 cc.) was left at room temperature for 88 hours. Isolation of the product with benzene in the usual manner gave crude 3α-acetoxy-12α-mesyloxy-methyl cholanate as a gum (2.83 g.; 96.6%). This material (2.82 g.) was mixed with K-t-butoxide (2.99 g.) and anhydrous DMSO (18.5 cc.), and the mixture was stirred and heated at 100°–110° C. (bath temperature) for 40 minutes in nitrogen atmosphere. Isolation of the product by pouring into water and acidification with dil. HCl gave crude 3α-hydroxy-$\Delta^{11}$-cholenic acid (2.247 g.). Methylation and acetylation as usual gave a pale yellow gum (2.369 g.). The latter (2.353 g.) was chromatographed on Florisil (60 g.) to give 3α-acetoxy-$\Delta^{11}$-methyl cholenate (1.334 g.). M.P. 109°–115° C. This represents a yield of about 60% based on the crude mesylate. The material can be purified by crystallization from methanol as above.

I claim:
1. A process for preparing a $\Delta^{11}$-steroid compound from a 12-hydroxy steroid comprising reacting said 12-hydroxy steroid with a sulfonating agent to provide a 12-sulfonate group and treating the resulting compound with a strong metallic alkoxide base in a dipolar aprotic solvent medium to remove the sulfonate group and introduce $\Delta^{11}$-unsaturation.

2. A process for preparing a $\Delta^{11}$-steroid compound from a 12α-hydroxy steroid comprising reacting said 12α-hydroxy steroid with an organic sulfonyl chloride to provide a 12α-organo-sulfonate group and treating the resulting compound with a metallic tertiary alcoholate in a dipolar aprotic solvent medium to remove the 12α-organo-sulfonate group and introduce $\Delta^{11}$-unsaturation.

3. A process for preparing a $\Delta^{11}$-steroid compound from a 12α-hydroxy steroid comprising reacting said 12α-hydroxy steroid with an organic sulfonyl chloride to provide a 12α-organo-sulfonate group and treating the resulting compound with potassium tertiary butoxide in dimethylsulfoxide.

4. A process for preparing a $\Delta^{11}$-steroid comprising tosylating a 12α-hydroxy steroid to provide a 12α-tosylate group and dehydrotosylating the resulting 12α-tosylate compound with potassium tertiary butoxide in dimethylsulfoxide.

5. A process for preparing a $\Delta^{11}$-steroid compound from a 12α-hydroxy steroid comprising treating said 12α-hydroxy steroid with benzenesulfonyl chloride to provide a 12α-benzene sulfonate group and dehydrosulfonating the resulting compound with potassium tertiary butoxide in dimethylsulfoxide.

6. A process for dehydrosulfonating a steroid compound having a C–12 sulfonate group to provide $\Delta^{11}$-unsaturation comprising treating said compound with a strong metallic alkoxide base in a dipolar aprotic solvent.

7. A process for dehydrosulfonating a steroid compound having a C–12 sulfonate group to provide $\Delta^{11}$-unsaturation comprising treating said compound with potassium tertiary butoxide in dimethylsulfoxide.

8. A process for dehydrosulfonating a steroid compound having a C–12 sulfonate group to provide $\Delta^{11}$-unsaturation comprising treating said compound with potassium tertiary butoxide in N-methylpyrrolidone.

9. A process for dehydrosulfonating a steroid compound having a C–12 sulfonate group to provide $\Delta^{11}$-unsaturation comprising treating said compound with potassium tertiary butoxide in sulfolane.

10. The process of claim 6 wherein the reaction mixture is heated at approximately 90–120° C. for about one hour to substantially completely remove sulfonic acid from the steroid compound and introduce the $\Delta^{11}$-double bond.

11. A process for preparing a $\Delta^{11}$-steroid compound comprising esterifying a 12α-hydroxy steroid compound of the cholane series with an organic sulfonyl chloride to provide the corresponding 12α-organo-sulfonate ester and treating said ester with a strong metallic alkoxide base in a dipolar aprotic solvent medium to dehydrosulfonate said ester and introduce $\Delta^{11}$-unsaturation.

12. A process for preparing 3α-hydroxy-$\Delta^{11}$-cholenic acid from 3α-acetoxy-12α-hydroxy-methyl cholanate comprising esterifying the 12α-hydroxy group of said compound with an organic sulfonyl chloride to provide the corresponding 12α-organo-sulfonate ester and treating said ester with a strong metallic alkoxide base in a dipolar aprotic solvent medium to dehydrosulfonate said ester with accompanying saponification of the 3-acetoxy and methyl ester groupings.

13. A process for preparing 3α-hydroxy-$\Delta^{11}$-cholenic acid comprising tosylating 3α-acetoxy-12α-hydroxy-methyl cholanate to provide 3α-acetoxy-12α-tosyloxy-methyl cholanate and treating said tosylate with potassium tertiary butoxide in dimethyl sulfoxide to effect dehydrotosylation with accompanying saponification of the 3-acetoxy and methyl ester groupings.

14. A process for preparing 3α-hydroxy-$\Delta^{11}$-cholenic acid comprising treating 3α-acetoxy-12α-hydroxy methyl cholanate with benzenesulfonyl chloride to provide 3α-acetoxy-12α-benzenesulfonyloxy-methyl cholanate and dehydrosulfonating the latter compound with potassium tertiary butoxide in dimethyl sulfoxide to introduce $\Delta^{11}$-unsaturation with accompanying saponification of the 3-acetoxy and methyl ester groupings.

15. A process for producing a $\Delta^{11}$-compound of the cholane series comprising heating a steroid compound of the cholane series having a 12α-organo-sulfonate group with potassium tertiary butoxide in dimethyl sulfoxide to dehydrosulfonate said compound with introduction of $\Delta^{11}$-unsaturation.

16. The process of claim 15 wherein the reaction mixture is heated at about 90–120° C. for approximately one hour.

17. The process of claim 15 wherein the cholane compound treated is a 12α-organo-sulfonate of 3α-acetoxy-12α-hydroxy-methyl cholanate.

18. The process of claim 17 wherein the cholane compound is 3α-acetoxy-12α-tosyloxy-methyl cholanate.

19. The process of claim 17 wherein the cholane compound is 3α-acetoxy - 12α - benzenesulfonyloxy-methyl cholanate.

20. The process of claim 17 wherein the cholane compound is 3α-acetoxy-12α-mesyloxy-methyl cholanate.

21. A process for preparing 3α-acetoxy-$\Delta^{11}$-methyl cholanate comprising sulfonating 3α-acetoxy-12α-hydroxy-methyl cholanate with an organo-sulfonyl chloride in pyridine, heating the resulting 12α-sulfonate with potassium tertiary butoxide in dimethyl sulfoxide to provide 3α-hydroxy-$\Delta^{11}$-cholenic acid, esterifying the acid to provide the ester and acetylating the latter compound.

References Cited by the Examiner
UNITED STATES PATENTS
3,069,440   12/62   Joseph et al. _____ 260—397

OTHER REFERENCES
Engel: "J. Org. Chem." (1961), vol. 26, No. 8, page 2868 relied on.

LEWIS GOTTS, *Primary Examiner.*

UNITED STATES PATENT OFFICE
CERTIFICATE OF CORRECTION

Patent No. 3,164,616　　　　　　　　　　　　　　January 5, 1965

Kekhusroo R. Bharucha

It is hereby certified that error appears in the above numbered patent requiring correction and that the said Letters Patent should read as corrected below.

Column 3, in the diagram IV, for $\xrightarrow{\frac{\text{Methylation}}{\text{acetylation}}}$ read $\xleftarrow{\frac{\text{Methylation}}{\text{acetylation}}}$ column 5, line 2, for "Cholanate", in italics, read -- Cholenate --, in italics.

Signed and sealed this 3rd day of August 1965.

(SEAL)
Attest:

ERNEST W. SWIDER　　　　　　　　　　　　　　EDWARD J. BRENNER
Attesting Officer　　　　　　　　　　　　　　Commissioner of Patents